US012536758B2

(12) United States Patent
Martin et al.

(10) Patent No.: US 12,536,758 B2
(45) Date of Patent: Jan. 27, 2026

(54) REPLACING SYNTHETIC OBJECT WITHIN XR ENVIRONMENT (71) Applicant: Hewlett-Packard Development Company, L.P., Spring, TX (US)

(72) Inventors: Robert P. Martin, Fort Collins, CO (US); Joseph Nouri, Fort Collins, CO (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 115 days.

(21) Appl. No.: 18/573,330

(22) PCT Filed: Jun. 30, 2021

(86) PCT No.: PCT/US2021/039810
§ 371 (c)(1),
(2) Date: Dec. 21, 2023

(87) PCT Pub. No.: WO2023/277897
PCT Pub. Date: Jan. 5, 2023

(65) Prior Publication Data
US 2024/0312151 A1    Sep. 19, 2024

(51) Int. Cl.
*G06T 19/00* (2011.01)
*G06F 3/01* (2006.01)

(52) U.S. Cl.
CPC ............ *G06T 19/006* (2013.01); *G06F 3/012* (2013.01)

(58) Field of Classification Search
CPC ............... G06T 19/006; G06T 2215/16; G06T 2219/2004; G06T 19/20; G06F 3/012; G06F 3/011; G06F 3/0346; G06V 20/20
See application file for complete search history.

(56) References Cited

U.S. PATENT DOCUMENTS

| 2018/0008141 | A1  | 1/2018  | Krueger         |
|--------------|-----|---------|-----------------|
| 2019/0206039 | A1  | 7/2019  | Cummings et al. |
| 2021/0019919 | A1  | 1/2021  | Schmuck et al.  |
| 2021/0405959 | A1* | 12/2021 | Lovitt ............... G06F 3/165 |

FOREIGN PATENT DOCUMENTS

CN    112241200 A    1/2021

* cited by examiner

*Primary Examiner* — Jeffery A Brier
(74) *Attorney, Agent, or Firm* — Quarles & Brady LLP (57) ABSTRACT A physical object is detected within one or multiple images captured by a camera of a head-mountable display (HMD). It is determined that the physical object is represented as a synthetic object within an extended reality (XR) environment of one or multiple images displayed by a display panel of the HMD. A portion of the synthetic object within the XR environment of the images displayed by the display panel of the HMD is replaced based on a corresponding portion of the physical object within the images captured by the camera.

15 Claims, 7 Drawing Sheets

REPLACING SYNTHETIC OBJECT WITHIN XR ENVIRONMENT

BACKGROUND

Extended reality (XR) technologies include virtual reality (VR), augmented reality (AR), and mixed reality (MR) technologies, and quite literally extend the reality that users experience. XR technologies may employ head-mountable displays (HMDs). An HMD is a display device that can be worn on the head. In VR technologies, the HMD wearer is immersed in an entirely virtual world, whereas in AR technologies, the HMD wearer's direct or indirect view of the physical, real-world environment is augmented. In MR, or hybrid reality, technologies, the HMD wearer experiences the merging of real and virtual worlds.

DETAILED DESCRIPTION

As noted in the background, a head-mountable display (HMD) can be employed as an extended reality (XR) technology to extend the reality experienced by the HMD's wearer. An HMD can include one or multiple small display panels in front of the wearer's eyes, as well as various sensors to detect or sense the wearer and/or the wearer's environment. Images on the display panels convincingly immerse the wearer within an XR environment, be it a virtual reality (VR), augmented reality (AR), a mixed reality (MR), or another type of XR.

An HMD can include one or multiple cameras, which are image-capturing devices that capture still or motion images. For example, such a camera or cameras of an HMD may be employed to capture images in front of the wearer of the HMD. The captured images may be of actual physical objects in front of the HMD. For example, such physical objects can include an electronic device having a display panel, such as a smartwatch worn by the HMD wearer, a smartphone of the wearer, and so on.

The XR environment of the images displayed on the display panels of the HMD may include a synthetic object corresponding to an actual physical object within the images captured by the HMD. For example, the synthetic object may be a virtual representation of an electronic device like a smartwatch or smartphone that corresponds to an actual smartwatch or smartphone within the captured images. Inclusion of such synthetic objects can lend verisimilitude to the XR environment, enhancing the overall XR experience of the wearer of the HMD.

Techniques described herein provide for replacing a portion of a synthetic object within an XR environment of images displayed by an HMD, based on a corresponding portion of a physical object within images captured by the HMD. For example, the corresponding portion of the physical object within the captured images may replace the portion of the synthetic object within the XR environment of the images displayed by the HMD. As another example, a virtual representation of the corresponding portion of the physical object within the captured images may be generated and replace the portion of the synthetic object within the XR environment of the images displayed by the HMD.

Replacing a portion of a synthetic object within the XR environment of the images displayed by the HMD based on the corresponding portion of the physical object within the images captured by the HMD further increases the verisimilitude of the XR environment beyond just inclusion of the synthetic object within the XR environment. For example, the display panel of an electronic device like a smartwatch or a smartphone within the captured images may display particular information at any given time. By replacing a portion of the synthetic object within the XR environment corresponding to the display panel based on the display panel of the electronic device within the captured images that shows such particular information, the particular information is also displayed on the synthetic object within the XR environment.

Figure 1A:
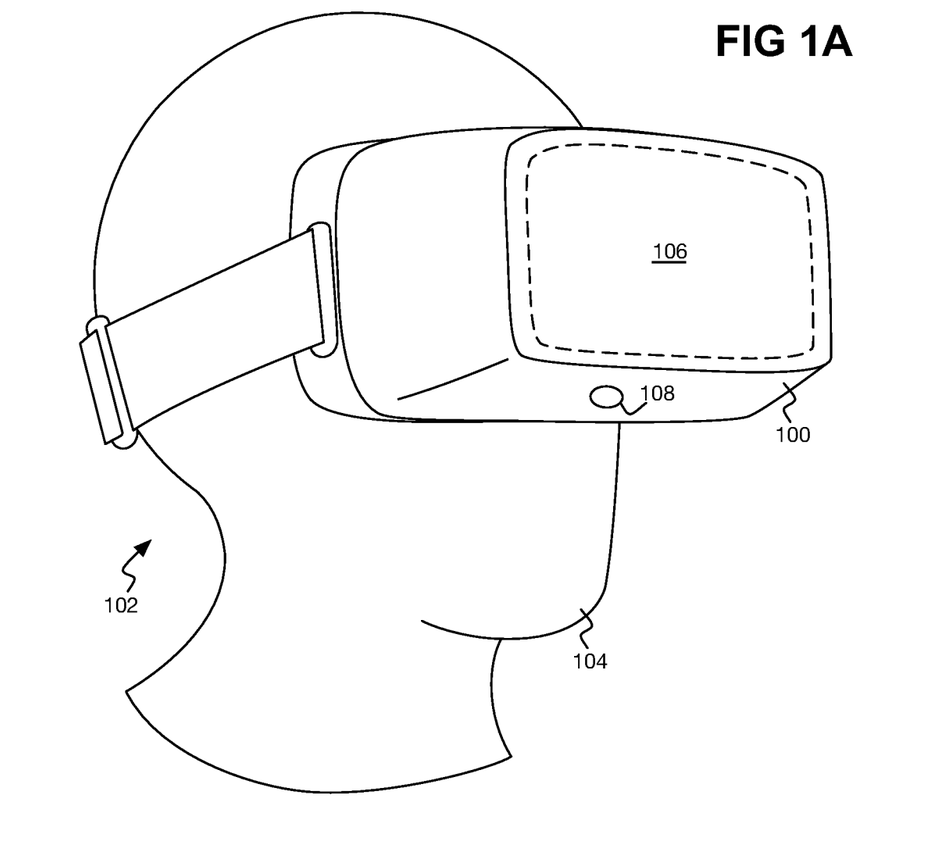
FIGS. 1A and 1B are perspective and block view diagrams, respectively, of an example head-mountable display (HMD) that can be used in an extended reality (XR) environment.
Figure 1B:
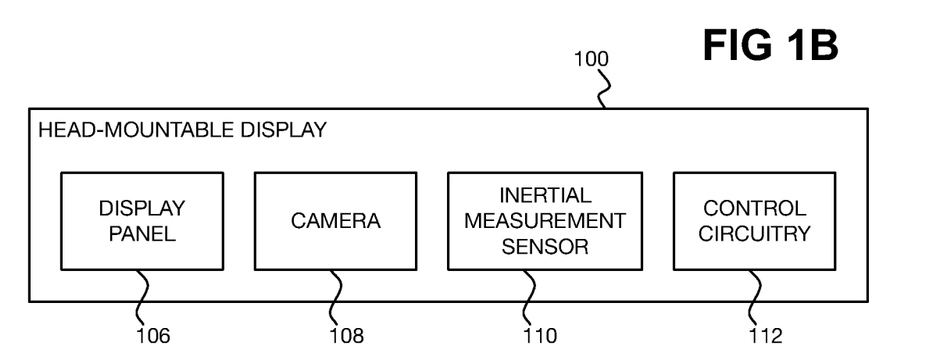

FIGS. 1A and 1B show perspective and block view diagrams of an example HMD 100 worn by a wearer 102 and positioned against the face 104 of the wearer 102 at one end of the HMD 100. The HMD 100 can include a display panel 106 inside the other end of the HMD 100 and that is positionable incident to the eyes of the wearer 102. The display panel 106 may in actuality include a right display panel incident to and viewable by the wearer 102's right eye, and a left display panel incident to and viewable by the wearer's 102 left eye. By suitably displaying images on the display panel 106, the HMD 100 can immerse the wearer 102 within an XR.

The HMD 100 can include an externally exposed camera 108 that captures images in front of the HMD 100 and thus in front of the wearer 102 of the HMD 100. There is one camera 108 in the example, but there may be multiple such cameras 108. Further, in the example the camera 108 is depicted on the bottom of the HMD 100, but may instead be externally exposed on the end of the HMD 100 in the interior of which the display panel 106 is located.

The HMD 100 can include an inertial measurement sensor 110 (per FIG. 1B), which may also be referred to as an inertial measurement unit (IMU). The inertial measurement sensor 110 can be situated within an enclosure of the HMD 100. The inertial measurement sensor 110 outputs orientation data indicative of the orientation of the HMD 100 in HMD device space. For instance, as the wearer 102 of the HMD 100 is rotating or otherwise moving his or her head, the inertial measurement sensor 110 can generate orientation data from which the orientation of the HMD 100 in HMD space can be calculated. The HMD space is the three-dimensional (3D) coordinate system in relation to which the HMD 100 monitors its orientation as the HMD 100 is rotated or otherwise moved by the wearer 102 in physical space.

The HMD 100 can include control circuitry 112 (per FIG. 1B). The control circuitry 112 may be in the form of a non-transitory computer-readable data storage medium storing program code executable by a processor. The processor and the medium may be integrated within an application-specific integrated circuit (ASIC) in the case in which the processor is a special-purpose processor. The processor may instead be a general-purpose processor, such as a central processing unit (CPU), in which case the medium may be a separate semiconductor or other type of volatile or non-volatile memory. The control circuitry 112 may thus be implemented in the form of hardware (e.g., a controller) or in the form of hardware and software.

Figure 2:
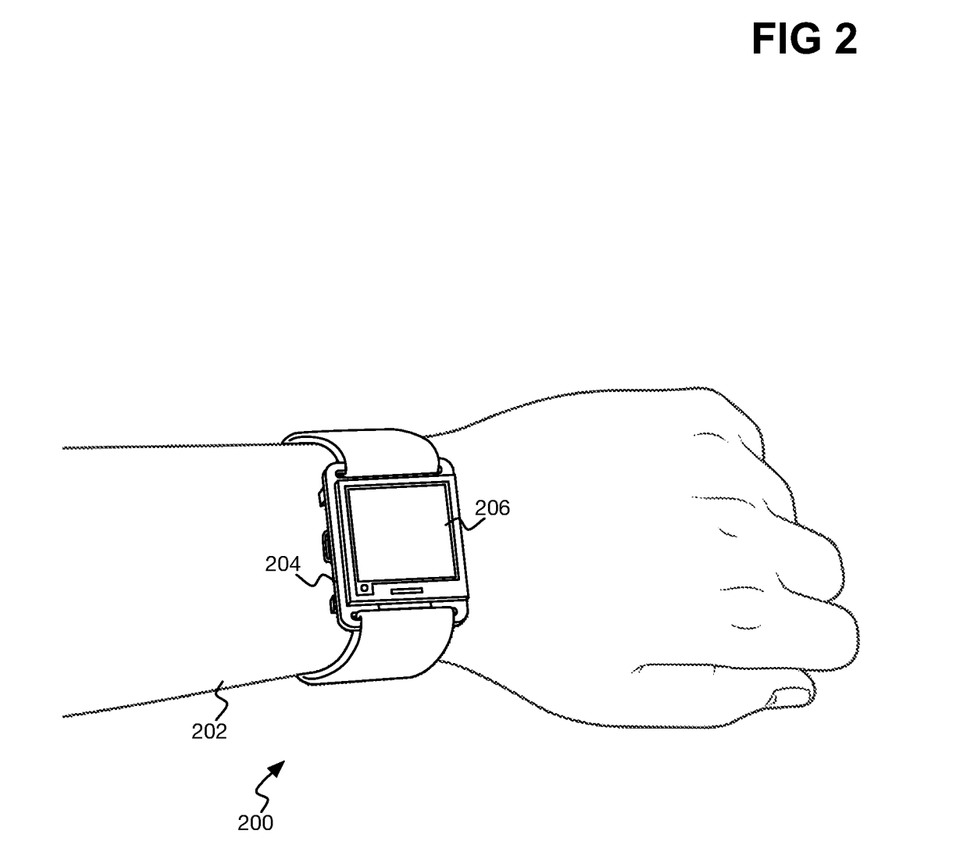
FIG. 2 is a diagram of an example image, including an electronic device as a physical object, captured by a camera of an HMD.

FIG. 2 shows an example image 200 that the camera 108 of the HMD 100 may capture. The image 200 includes the wearer 102's left wrist 202, on which the wearer 102 is wearing a smartwatch 204 having a display panel 206. The smartwatch 204 is one example of an electronic device, which itself is one example of a physical object. Another example of an electronic device is a smartphone. Another example of a physical object is one that is a non-electronic device. The display panel 206 is one example of a portion of the smartwatch 204, and thus a portion of an electronic device and a portion of a physical object. The display panel 206 may be currently displaying information, which can change over time. For example, display panel 206 may show the current time and date, as well as other information.

Figure 3:
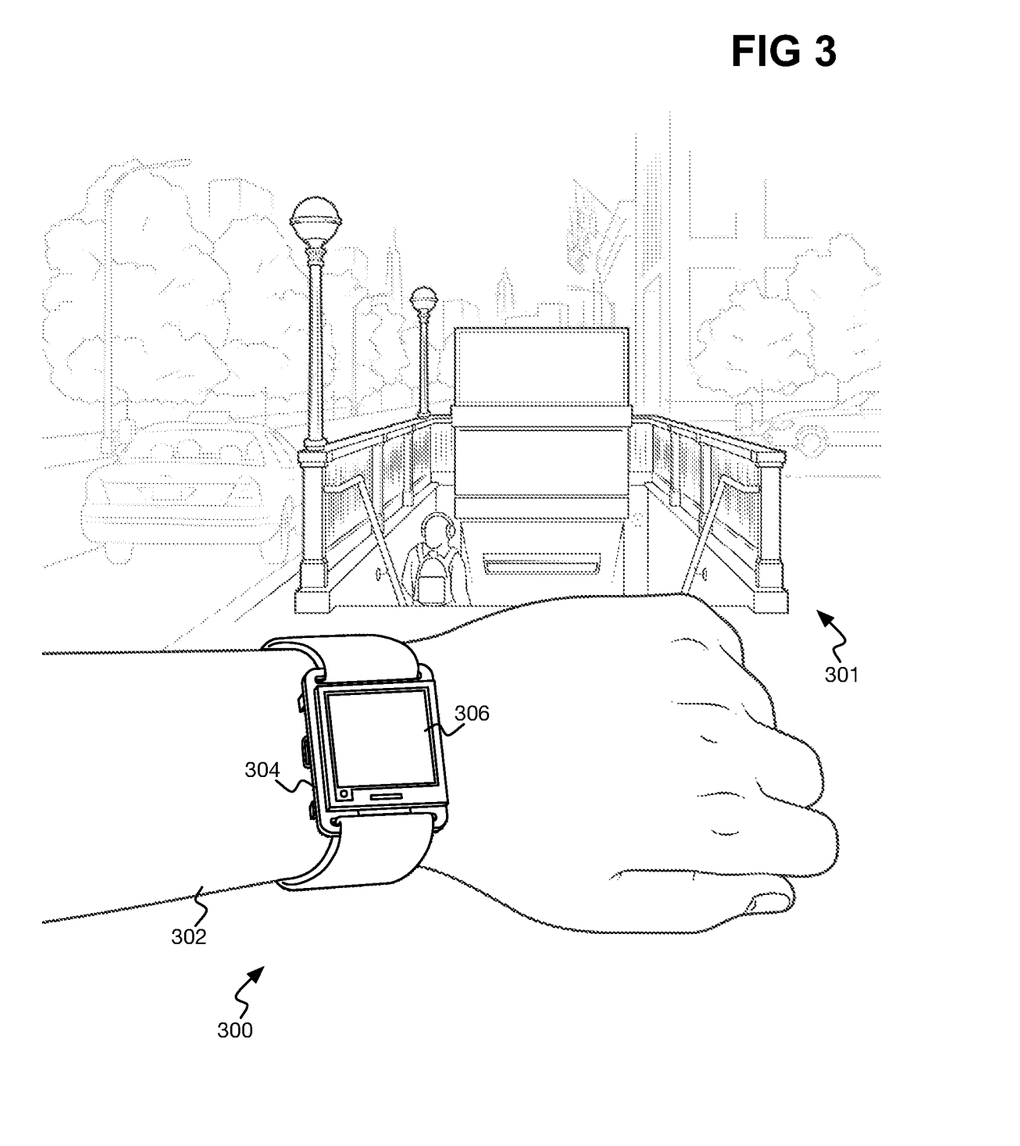
FIG. 3 is a diagram of an example image of an XR environment, including a synthetic object representing the electronic device of FIG. 2, displayed by a display panel of an HMD.

FIG. 3 shows an example image 300 of an XR environment 301 displayed by the display panel 106 of the HMD 100 for viewing by the wearer 102 of the HMD 100. The XR environment 301 of the example is of a city street, to immerse the wearer 102 in the virtual experience of walking down the city street when in fact the wearer 102 may not in actuality be walking down the city street. The XR environment 301 includes a virtual or synthetic representation 302 of the wearer 102's wrist 202. In the example, the synthetic representation 302 is at the same orientation as the wearer 102's wrist 202 in the captured image 200, but in other case may be at a different orientation.

The XR environment 301 also includes a virtual or synthetic object 304 corresponding to the actual smartwatch 204 (or other electronic device or physical object) of the wearer 102. The virtual or synthetic object 304 therefore similarly has a display panel 306. However, in the image 300, the display panel 306 of the synthetic object 304 does not display any information, unlike the actual display panel 306 of the smartwatch 204 worn by the wearer 102 of the HMD 100.

Figure 4:
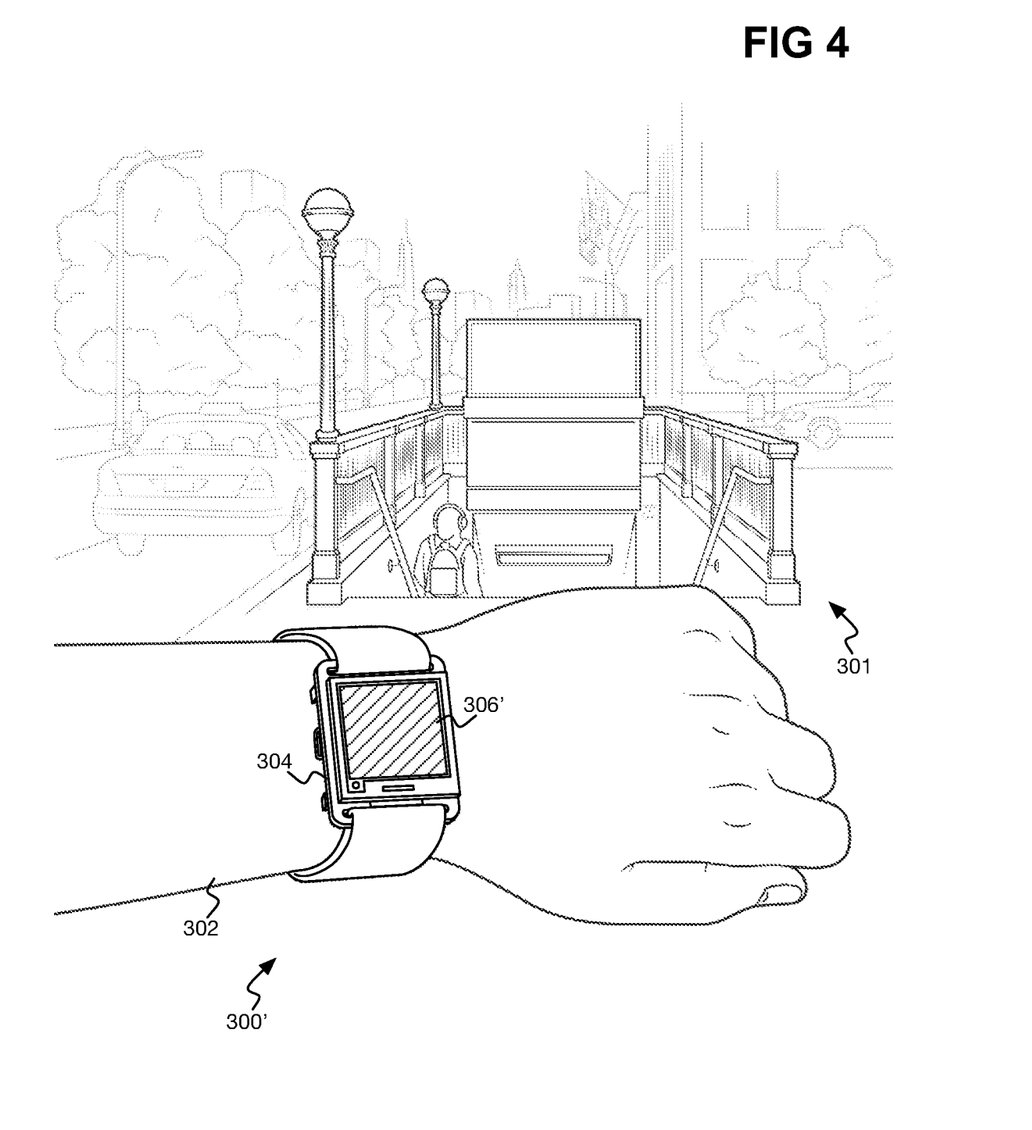
FIG. 4 is a diagram of the example image of the XR environment of FIG. 3 in which a display panel of the synthetic object of the displayed image of FIG. 3 has been replaced based on a display panel of the electronic device of the captured image of FIG. 2.

FIG. 4 shows another example image 300' of the XR environment 301 displayed by the display panel 106 for viewing by the wearer 102 of the HMD 100. The image 300' corresponds to the image 300. However, the display panel 306 of the synthetic object 304 corresponding to the actual smartwatch 204 of the wearer 102 has been replaced in the image 300' with a display panel 306' based on the actual display panel 206 within the captured image 200, as indicated by shading in FIG. 4.

For example, the display panel 306' may be the portion of the captured image 200 that includes the actual display panel 206 of the smartwatch 204 of the wearer 102, orientated to match the orientation of the synthetic object 304 within the XR environment 301 if this orientation differs from that of the smartwatch 204 in the image 200. As another example, the display panel 306' may be a virtual representation of the display panel 206 of the actual smartwatch 204, which is generated to include the information currently displayed by the actual display panel 206. In either case, the XR environment 301 in the image 300' thus includes the information currently displayed by the display panel 206, unlike the XR environment 301 in the image 300.

Figure 5:
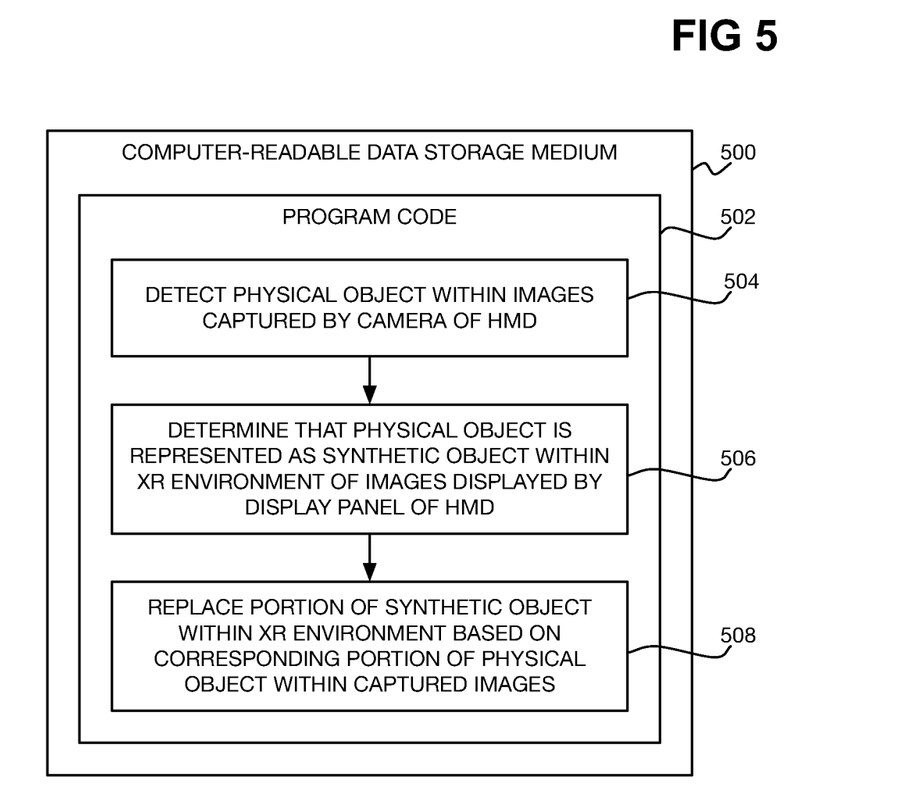
FIG. 5 is a diagram of an example non-transitory computer-readable data storage medium storing program code for replacing a portion of a synthetic object within an XR environment of an image displayed by a display panel of an HMD based on a corresponding portion of a physical object of an image captured by a camera of the HMD.

FIG. 5 shows an example non-transitory computer-readable data storage medium 500 storing program code 502 executable by a processor to perform processing. The program code 502 may be executed by the control circuitry 112 of the HMD 100, in which case the control circuitry 112 implements the data storage medium 500 and the processor. The program code 502 may instead be executed by a host device to which the HMD 100 is communicatively connected, such as a host computing device like a desktop, laptop, or notebook computer, a smartphone, or another type of computing device like a tablet computing device, and so on.

The processing includes detecting a physical object, such as the smartwatch 204 or another electronic device, within images, such as the image 200, captured by the camera 108 of the HMD 100 (504). Different ways by which the physical object can be detected within the captured images are described later in the detailed description. The processing includes determining that the physical object is represented as a synthetic object, such as the synthetic object 304, within an XR environment 301 of images, such as the image 300, displayed by the display panel 106 of the HMD 100 (506). Determining that the physical object detected within the captured images is represented as a synthetic object within the XR environment 301 can occur in a number of different ways.

For example, the wearer 102 or another user may have set up the XR environment 301 to include the synthetic object. That is, when configuring the XR environment 301, the wearer 102 or another user may specify that the XR environment 301 is to include the synthetic object that represents a particular physical object, such as a smartwatch 204 or another electronic device. In the case in which the program code 502 is executed by the HMD 100, the HMD 100 may receive indication that the synthetic object represents the detected particular physical object from the host device that may be generating the XR environment 301 and thus the images of the XR environment 301 for display by the display panel 106 of the HMD 100.

As another example, the host device may have information regarding a number of different physical objects. Upon detecting the physical object in part 504, the host device may determine whether the detected physical object corresponds to any physical object for which it has information. If the detected physical object is a known physical object in this respect, then the host device may generate the XR environment 301 and thus the images of the XR environment 301 for display by the display panel 106 of the HMD 100 to include the synthetic object. Therefore, the physical object is represented as the synthetic object within the XR environment 301. As in the prior example, in the case in which the program code 502 is executed by the HMD 100, the HMD 100 may receive indication that the synthetic object represents the detected physical object from the host device.

The processing includes replacing, within the images displayed by the display panel 106 of the HMD 100, such as the image 300', a portion of the synthetic object within the XR environment 301 based on a corresponding portion of the physical object within the captured images (508). For example, the display panel 306 of the synthetic object 304 within the displayed image 300 can be replaced by the display panel 306' within the displayed image 300'. The display panel 306' can in turn be the portion of the captured image 200 including the display panel 206 of the smartwatch 204, or be a generated virtual representation of the display panel 206 that includes the information actually shown on the display panel 206. Different implementation examples of such replacement are described later in the detailed description.

Figure 6:
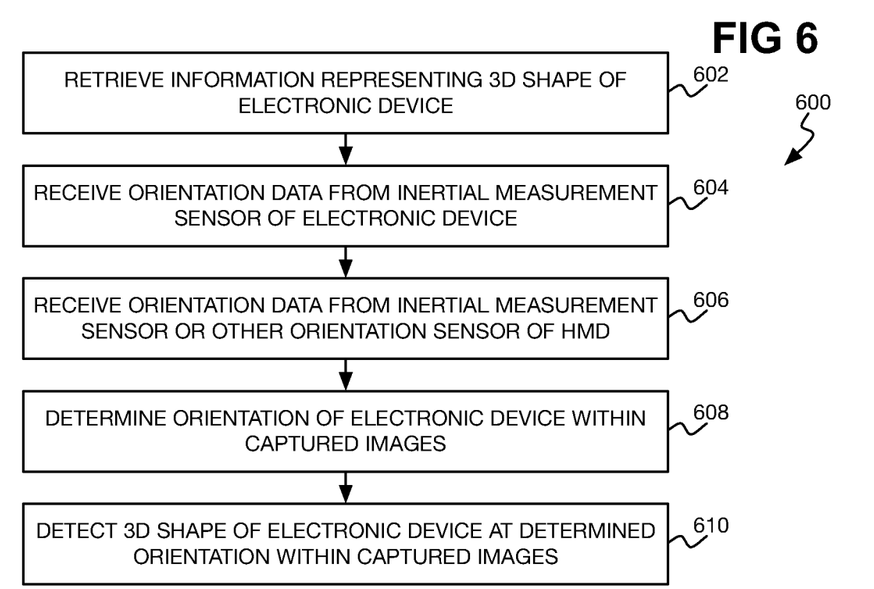
FIG. 6 is a flowchart of an example method for detecting an electronic device within an image captured by a camera of an HMD.

FIG. 6 shows an example method 600 for detecting an electronic device within an image captured by the camera 108 of the HMD 100. The method 600 is particularly described in relation to detecting the smartwatch 204 within the captured image 200. The method 600 is one way by which part 504 of the processing of FIG. 5 can be implemented.

The method 600 includes retrieving information representing a three-dimensional (3D) shape of the electronic device (602). For example, the 3D shape of the smartwatch 204 may be stored by the host device to which the HMD 100 is communicatively connected. In the case in which the HMD 100 performs the method 600, the HMD 100 receives this information from the host device.

The method 600 includes receiving orientation data from an inertial measurement sensor or other orientation sensor of the electronic device (604). For example, the smartwatch 204 may, like the HMD 100, include an inertial measurement sensor, which may similarly be referred to as an IMU. This inertial measurement sensor can be situated within an enclosure of the smartwatch 204. The inertial measurement sensor outputs orientation data indicative of the orientation of the smartwatch 204 in smartwatch (i.e., electronic device) space. For instance, as the wearer 102 of the smartwatch 204 is rotating or otherwise moving his or her wrist 202 and thus the smartwatch 204, the inertial measurement sensor can generate orientation data from which the orientation of the smartwatch 204 in electronic device space can be calculated. The electronic device space is the 3D coordinate system in relation to which the smartwatch 204 (or other electronic device) monitors its orientation as the smartwatch 204 is rotated or otherwise moved by the wearer 102 in physical space. The orientation data received from the smartwatch 204 thus indicates the orientation of the smartwatch 204 in electronic device space.

The smartwatch 204 may instead or additionally include an orientation sensor other than an inertial measurement sensor by which the orientation of the smartwatch 204 in electronic device space is indicated. An example of such a sensor is an optical sensor, such as an optical proximity sensor. Such a sensor uses optical signals to provide orientation data indicative of the orientation of the smartwatch 204 in electronic device space. More generally, therefore, the smartwatch 204 can include an orientation sensor, such as an IMU, an optical proximity sensor, and so on, that outputs orientation data indicating the orientation of the smartwatch 204 in electronic device space.

The method 600 includes receiving orientation data from the inertial measurement sensor 110 of the HMD 100 (606), which indicates the orientation of the HMD 100 in HMD space. The method 600 includes then determining the orientation of the electronic device within the images captured by the camera 108 of the HMD 100 (608)—i.e., within HMD space—based on the orientation of the electronic device in electronic device space and the orientation of the HMD 100 in HMD space. For example, the orientation of the smartwatch 204 within the captured image 200 can be determined, based on the orientation of the smartwatch 204 in electronic device space and the orientation of the HMD 100 in HMD space.

The electronic device space can be mapped to the HMD space by generating a transformation matrix that transforms the electronic device space to the HMD space. The transformation matrix can be generated when the orientations of the smartwatch 204 and the HMD 100 are both known, during a calibration process. For example, the wearer 102 may be requested to orient his or head straight, and look forward, while positioning the smartwatch 204 parallel to the floor (and thus perpendicular to the axis of the wearer 102's head).

At this time, the orientation data from the smartwatch 204's inertial measurement sensor and the orientation from the HMD 100's inertial measurement sensor may be received. The orientation data from the smartwatch 204's inertial measurement sensor indicates the smartwatch 204's orientation in electronic device space, and the orientation data from the HMD 100's inertial measurement sensor indicates the HMD 100's orientation in HMD space. The transformation matrix can then be calculated from the (known) orientation of the smartwatch 204 in electronic device space and the (known) orientation of the HMD 100 in HMD space.

Subsequent to calibration, the orientation of the smartwatch 204 within the image 200 captured by the camera 108 of the HMD 100 can then be calculated in part 608 by applying the transformation matrix to the orientation of the smartwatch 204. The orientation of the smartwatch 204 within the captured image 200 is the orientation of the smartwatch 204 in HMD space. The orientation of the smartwatch 204 within the captured image 200 is thus said to be determined based on the orientation of the smartwatch 204 in electronic device space and the orientation of the HMD 100 in HMD space.

The method 600 includes detecting the 3D shape of the electronic device at the determined orientation within the captured images (610). For example, the 3D shape of the smartwatch 204 at the orientation of the smartwatch 204 within the captured image 200 (i.e., in HMD space) is detected. The retrieved information representing the 3D shape of the smartwatch 204 is at a particular orientation, and is likely to differ from the actual orientation of the smartwatch 204 within the captured image 200. Therefore, before inspecting the image 200 to locate the smartwatch 204's 3D shape, the 3D shape is first adjusted so that it has the same orientation as the smartwatch 204 in the captured image 200.

Figure 7:
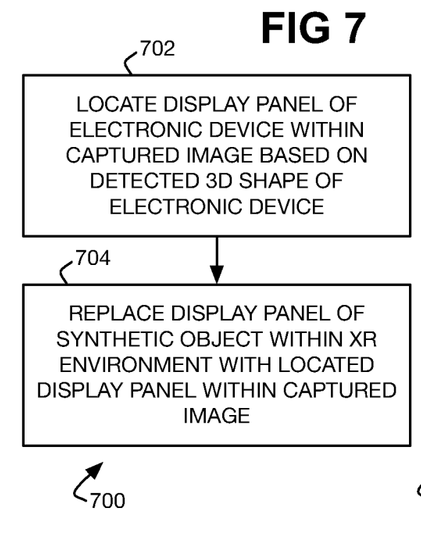
FIG. 7 is a flowchart of an example method for replacing a display panel of a synthetic object within an XR environment of an image displayed by a display panel of an HMD based on a display panel of an electronic device within an image captured by a camera of the HMD as detected per FIG. 6.

FIG. 7 shows an example method 700 for replacing, within an XR environment of an image displayed by the display panel 106 of the HMD 100, a display panel of a synthetic object based on the display panel of the detected electronic device within an image captured by the camera 108 of the HMD 100. The method 700 can be used when the electronic device has been detected within the captured image per the method 600. The method 700 is particularly described in relation to replacing, within the XR environment 301 of the displayed image 300', the display panel 306 of the synthetic object 304 with the display panel 206 of the smartwatch 204 within the captured image 200. The method 700 is one way by which part 508 of the processing of FIG. 5 can be implemented.

The method 700 includes locating the display panel of the electronic device within the image captured by the camera 108 of the HMD 100, based on the detected 3D shape of the electronic device within the captured image (702). For example, the display panel 206 of the smartwatch 204 may be located within the captured image 200 based on the detected 3D shape of the smartwatch 204 within the image 200. The retrieved information regarding the 3D shape of the smartwatch 204 can include information as to where the display panel 206 is located within the 3D shape. Therefore, upon detecting the smartwatch 204's 3D shape within the captured image 200, the location of the display panel 206 within the captured image 200 can be identified based on such information.

The method 700 includes then replacing the display panel of the synthetic object within the XR environment of the image displayed by the display panel 106 of the HMD 100 with the located display panel of the electronic device within the image captured by the camera 108 of the HMD 100 (704). For example, the portion of the captured image 200 including (i.e., corresponding to or circumscribing) the display panel 206 of the smartwatch 204 can replace the display panel 306 of the synthetic object 304 within the XR environment 301. Therefore, the resulting displayed image 300' includes this portion of the captured image 200, as the display panel 306' of the synthetic object 304. The portion of the captured image 200 in question may first have to be resized to match the size of the display panel 306 of the synthetic object 304.

The foregoing assumes that the orientation of the synthetic object in the XR environment 301 is the same as the orientation of the smartwatch 204 within the captured image 200. However, in another case the orientation of the synthetic object in the XR environment 301 may be different than the orientation of the smartwatch 204 within the captured image 200. In such instance, before the display panel 306 of the synthetic object 304 is replaced with the display panel 206 of the smartwatch 204 within the XR environment 301, the display panel 206 is first adjusted so that its orientation matches the orientation of the synthetic object 304.

For example, the portion of the captured image 200 including the display panel 206 of the smartwatch 204 can be adjusted to match the orientation of the synthetic object 304, by applying, to the orientation of the smartwatch 204 within the captured image 200, a transformation matrix mapping HMD space to the orientation of the synthetic object 304 within the XR environment 301. The orientation of the synthetic object 304 within the XR environment 301 relative to the orientation of the HMD space is known, since the synthetic object 304 is generated. Therefore, a transformation matrix mapping HMD space to the orientation of the synthetic object 304 within the XR environment 301 can be calculated for applying to the orientation of the smartwatch 204 within the captured image 200.

Figure 8:
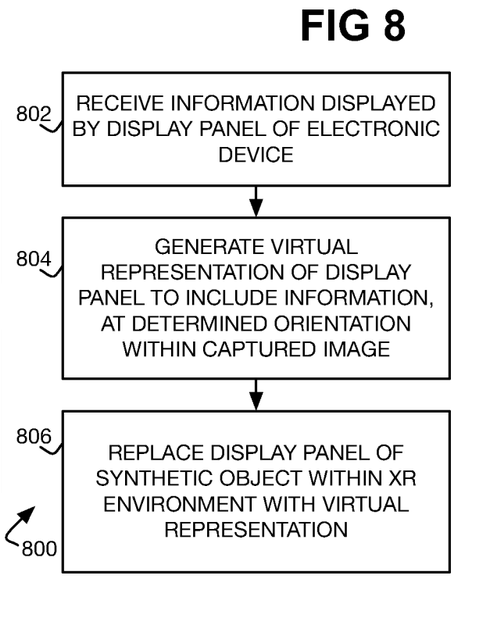
FIG. 8 is a flowchart of another example method for replacing a display panel of a synthetic object within an XR environment of an image displayed by a display panel of an HMD based on a display panel of an electronic device within an image captured by a camera of the HMD as detected per FIG. 6.

FIG. 8 shows another example method 800 for replacing, within an XR environment of an image displayed by the display panel 106 of the HMD 100, a display panel of a synthetic object based on the display panel of the detected electronic device within an image captured by the camera 108 of the HMD 100. The method 800, like the method 700, can be used when the electronic device has been detected within the captured image per the method 600. The method 800 is particularly described in relation to replacing, within the XR environment 301 of the displayed image 300', the display panel 306 of the synthetic object with a generated virtual representation of the display panel 206 of the smartwatch 204 within the captured image 200 that includes the information currently displayed by the display panel 206. The method 800 is another way by which part 508 of the processing of FIG. 5 can be implemented.

The method 800 includes receiving the information currently displayed by the display panel of the electronic device (i.e., as reflected in the image captured by the camera 108 of the HMD 100) (802). For example, information currently displayed by the display panel 206 of the smartwatch 204 may be received. Such information may be received in a manner other than from the captured image 200, however. For instance, the information may be received by a screencast application running on the smartwatch 204, or may be received from a server computing device with which the smartwatch 204 is communicating and that has knowledge of the information currently being displayed on the display panel 206. The information may be in the form of a static or motion image of what is currently displayed on the display panel 206.

The method 800 includes generating a virtual representation of the display panel of the electronic device to include the information currently displayed by the display panel, at the determined orientation of the electronic device within the image captured by the camera 108 of the HMD 100 (804). For example, a virtual representation of the display panel 206 of the smartwatch 204 can be generated to include the information currently displayed by the display panel 206, at the orientation of the smartwatch 204 within the captured image 200 as determined in part 608 of the method 600. Generation of the virtual representation can include scaling the previously received static or motion image in size to match the size of the display panel 306 of the virtual object 304 within the XR environment 301.

Further, the previously received image of the information currently displayed on the display panel 206 of the smartwatch 204 may be at a neutral orientation in which the smartwatch 204 is parallel to the face 104 of the wearer 102 of the HMD 100 (i.e., perpendicular to the wearer 102's line of sight). For example, for a rectangular or circular display panel 206, the received image may likewise be rectangular or circular, respectively. Therefore, the image is adjusted (e.g., rotated in 3D space) so that its orientation matches the orientation of the smartwatch 204 within the captured image 200. (This assumes that the orientation of the smartwatch 204 in the captured image 200 is the same as the orientation of the synthetic object 304 in the XR environment 301; to the extent that they differ, a transformation matrix can also be applied, as described above in relation to part 704 of the method 700.)

The method 800 includes then replacing the display panel of the synthetic object within the XR environment of the image displayed by the display panel 106 of the HMD 100 with the virtual representation that has been generated (806). For example, the generated virtual representation of the display panel 206 of the smartwatch 204 can replace the display panel 306 of the synthetic object 304 within the XR environment 301. Therefore, the resulting displayed image 300' includes the generated virtual representation, as the display panel 306' of the synthetic object 304.

Figure 9A:
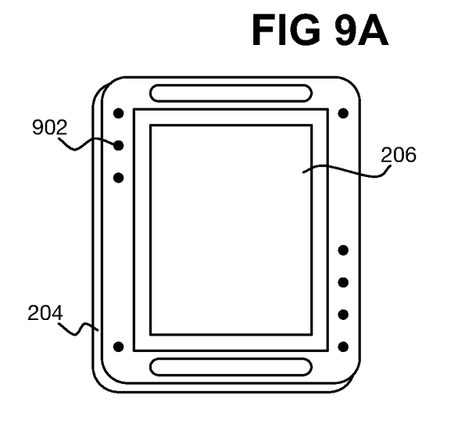
FIGS. 9A and 9B are diagrams depicting another way for detecting an electronic device, or other physical object, within an image captured by a camera of an HMD.
Figure 9B:
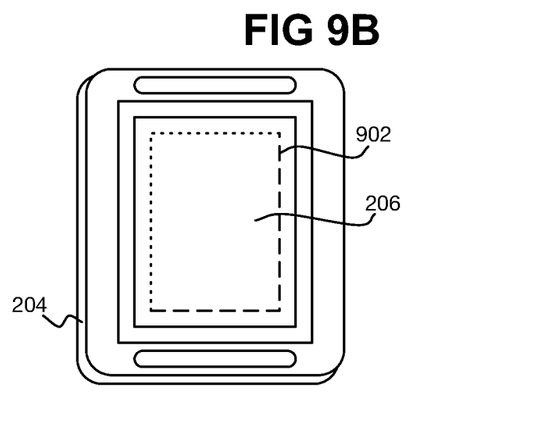

FIGS. 9A and 9B show another way for detecting an electronic device within an image captured by the camera 108 of the HMD 100. This additional way can be used in addition to and/or in lieu of the method 600, and is particularly described in relation to detecting the smartwatch 204 within the captured image 200. Part 504 of the processing of FIG. 5 can therefore be additionally or instead implemented by using the approach described in relation to FIGS. 9A and 9B.

The approach of FIGS. 9A and 9B utilize fiducial marks 902 to detect the smartwatch 204 within the captured image 200. In FIG. 9A, the fiducial marks 902 are physical fiducial marks on the smartwatch 204 itself, such as physical marks imprinted on the case, housing, or enclosure of the smartwatch 204. The fiducial marks 902 are in the form of an asymmetric pattern of dots in the example. By comparison, in FIG. 9B, the fiducial marks are virtual fiducial marks displayed by the display panel 206 of the smartwatch 204. The fiducial marks in the example circumscribe the perimeter of the display panel 206, as dots on the top and left edges and as dashes on the right and bottom edges (where the display panel 206 is rectangular but not square).

The fiducial marks 902 are discernable within the captured image 200. The number and the locations of the fiducial marks 902 are known. Therefore, the orientation of the smartwatch 204 in the captured image 200 depends on which fiducial marks 902 appear within the captured image 200, and the pattern and/or positions of the marks 902 within the image 200. Which fiducial marks 902 appear within the captured image 200 and the pattern and/or positions of the marks 902 relative to one another within the image is itself dependent on the current pose of the smartwatch 204 and the position and perspective of the camera 108 of the HMD 100 that captured the image 200. The smartwatch 204 can thus be detected within the captured image 200 by detecting the physical or virtual fiducial marks 902 within the image 200.

The smartwatch 204 can include other fiducial marks 902 in addition to or in lieu of those depicted in FIGS. 9A and 9B. As another example of physical fiducial marks 902, the smartwatch 204 may have certain physical characteristics that can be employed as physical fiducial marks 902 by which the orientation of the smartwatch 204 in the captured image 200 can be determined. For example, the smartwatch 204 may have a unique asymmetric shape that can be used as the fiducial marks 902, or various protrusions, edges, corners, and so on that are asymmetric in placement and/or configuration and therefore can be used as the fiducial marks 902. That is, the smartwatch 204 may not have dedicated physical fiducial marks 902 per se as in FIG. 9A, but instead have unique edges or other points that can serve as physical fiducial marks 902.

As another example of virtual fiducial marks 902, micro light-emitting diodes (mLEDs) can be integrated behind the display panel 206 of the smartwatch 204. The mLEDs may illuminate in the infrared or ultraviolet spectrum so they are not discernible in the visible light spectrum. The mLEDs are organized in an asymmetric pattern, and when illuminated form virtual fiducial marks 902 that can be used to determine the orientation of the smartwatch 204 in the captured image 200. That is, rather than the display panel 206 displaying virtual fiducial marks 902, the mLEDs display the virtual fiducial marks 902.

Figure 10:
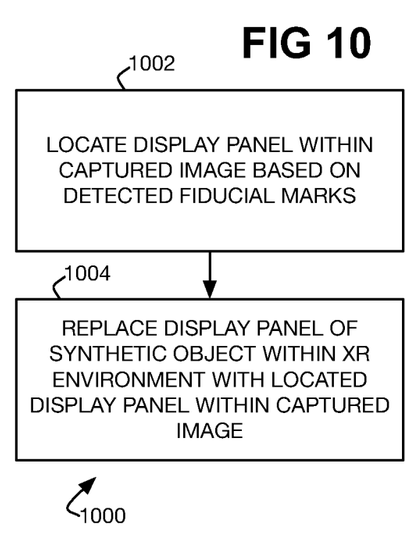
FIG. 10 is a flowchart of an example method for replacing a display panel (or other portion) of a synthetic object within an XR environment of an image displayed by a display panel of an HMD based on a display panel of an electronic device (or a portion of another physical object) within an image captured by a camera of the HMD as detected per FIG. 9A or 9B.

FIG. 10 shows an example method 1000 for replacing, within an XR environment of an image displayed by the display panel 106 of the HMD 100, a display panel of a synthetic object based on the display panel of the detected electronic device within an image captured by the camera 108 of the HMD 100. The method 1000 can be used when the electronic device has been detected within the captured image by detecting the fiducial marks 902 per FIG. 9A or 9B. The method 1000 is particularly described in relation to replacing, within the XR environment 301 of the displayed image 300', the display panel 306 of the synthetic object 304 with the display panel 206 of the smartwatch 204 within the captured image 200. The method 700 is one way by which part 508 of the processing of FIG. 5 can be implemented.

The method 1000 includes locating the display panel of the electronic device within the image captured by the camera 108 of the HMD 100, based on the detected fiducial marks within the captured image (1002). For example, the display panel 206 of the smartwatch 204 may be located within the captured image 200 based on the detected fiducial marks 902 within the image 200. The positioning of the fiducial marks 902 relative to the display panel 206 is known. Therefore, upon detecting the fiducial marks 902 within the captured image 200, the location of the display panel 206 within the captured image 200 can be identified based on this information.

The method 1000 includes then replacing the display panel of the synthetic object within the XR environment of the image displayed by the display panel 106 of the HMD 100 with the located display panel of the electronic device within the image captured by the camera 108 of the HMD 100 (1004). For example, the portion of the captured image 200 including (i.e., corresponding to or circumscribing) the display panel 206 of the smartwatch 204 can replace the display panel 306 of the synthetic object 304 within the XR environment 301. Therefore, the resulting displayed image 300' includes this portion of the captured image 200, as the display panel 306' of the synthetic object 304. The portion of the captured image 200 in question may first have to be resized to match the size of the display panel 306 of the synthetic object 304.

The foregoing assumes that the orientation of the synthetic object in the XR environment 301 is the same as the orientation of the smartwatch 204 within the captured image 200. However, in another case the orientation of the synthetic object in the XR environment 301 may be different than the orientation of the smartwatch 204 within the captured image 200. In such instance, before the display panel 306 of the synthetic object 304 is replaced with the display panel 206 of the smartwatch 204 within the XR environment 301, the display panel 206 is first adjusted so that its orientation matches the orientation of the synthetic object 304. Such adjustment can be performed as described in relation to part 704 of the method 700.

Figure 11:
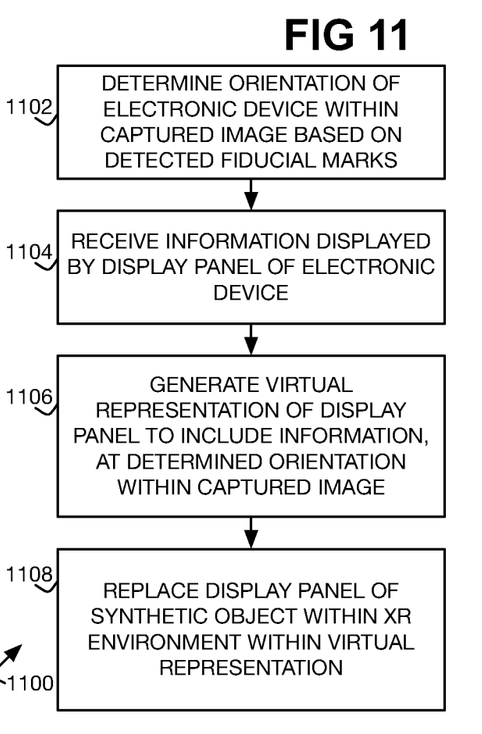
FIG. 11 is a flowchart of an example method for replacing a display panel of a synthetic object within an XR environment of an image displayed by a display panel of an HMD based on a display panel of an electronic device within an image captured by a camera of the HMD as detected per FIG. 9A or 9B.

FIG. 11 shows another example method 800 for replacing, within an XR environment of an image displayed by the display panel 106 of the HMD 100, a display panel of a synthetic object based on the display panel of the detected electronic device within an image captured by the camera 108 of the HMD 100. The method 1100, like the method 1000, can be used when the electronic device has been detected within the captured image by detecting the fiducial marks 902 as described in relation to FIGS. 9A and 9B. The method 1100 is particularly described in replacing, within the XR environment 301 of the displayed image 300', the display panel 306 of the synthetic object with a generated virtual representation of the display panel 206 of the smartwatch 204 within the captured image 200 that includes the information currently displayed by the display panel 206. The method 1100 is another way by which part 508 of the processing of FIG. 5 can be implemented.

The method 1100 includes determining the orientation of the electronic device within the captured image, based on the fiducial marks detected within the image (1102). For example, the orientation of the smartwatch 204 within the captured image 200 can be determined based on the fiducial marks 902 detected within the image 200. The orientation of the smartwatch 204 is determined as the orientation of the detected fiducial marks 902 within the captured image 200.

For example, the neutral orientation of the smartwatch 204 may be the orientation at which the display panel 206 is parallel to the face 104 of the wearer 102 of the HMD 100 (i.e., at which the display panel 206 is perpendicular to the wearer 102's line of sight). At this neutral orientation, the display panel 206 may have a known circular or non-square rectangular shape, such that the fiducial marks 902 have known positions and/or a pattern in correspondence with this shape. To the extent that the fiducial marks 902 have actual positions and/or a pattern in the captured image 200 that corresponds to a rotation in 3D space of the known positions and/or pattern, the orientation of the display panel 206 and thus the smartwatch 204 has a corresponding rotation in 3D space. The orientation of the smartwatch 204 within the captured image 200 is therefore the rotation in 3D space from its neutral orientation.

The method 1100 includes receiving the information currently displayed by the display panel of the electronic device (i.e., as reflected in the image captured by the camera 108 of the HMD 100) (1104). For example, information currently displayed by the display panel 206 of the smartwatch 204 may be received. The currently displayed information may be received as described in relation to part 802 of the method 800.

The method 1100 includes generating a virtual representation of the display panel of the electronic device to include the information currently displayed by the display panel, at the determined orientation of the electronic device within the image captured by the camera 108 of the HMD 100 (1106). For example, a virtual representation of the display panel 206 of the smartwatch 204 can be generated to include the information currently displayed by the display panel 206, at the orientation of the smartwatch 204 within the captured image 200 as determined in part 1102. The virtual representation may be generated as described in relation to part 804 of the method 800.

The method 1100 includes then replacing the display panel of the synthetic object within the XR environment of the image displayed by the display panel 106 of the HMD 100 with the virtual representation that has been generated (1108). For example, the generated virtual representation of the display panel 206 of the smartwatch 204 can replace the display panel 306 of the synthetic object 304 within the XR environment 301. Therefore, the resulting displayed image 300' includes the generated virtual representation, as the display panel 306' of the synthetic object 304.

Techniques have been described for replacing a portion of a synthetic object within an XR environment of images displayed by an HMD, based on a corresponding portion of a physical object within images captured by the HMD. The portion of the synthetic object may be replaced with the corresponding portion of the physical object within the captured images, or may be replaced with a virtual representation of the corresponding portion of the physical object within the captured images. The result is increased verisimilitude of the XR environment experienced by the wearer of the HMD.

We claim:

1. A non-transitory computer-readable data storage medium storing program code executable by a processor to perform processing comprising:

detecting a physical object within one or multiple images captured by a camera of a head-mountable display (HMD), wherein the physical object is an electronic device that includes a display panel;

determining that the physical object is represented as a synthetic object within an extended reality (XR) environment of one or multiple images displayed by a display panel of the HMD; and replacing a portion of the synthetic object within the XR environment of the images displayed by the display panel of the HMD, based on a corresponding portion of the physical object within the images captured by the camera, wherein the portion of the synthetic object is a display panel of the synthetic object, and wherein the corresponding portion of the physical object is the display panel of the electronic device.

2. The non-transitory computer-readable data storage medium of claim 1, wherein the electronic device includes an inertial measurement sensor, and detecting the physical object within the images captured by the camera comprises:

retrieving information representing a three-dimensional (3D) shape of the electronic device;

receiving object orientation data from the inertial measurement sensor of the electronic device indicative of an orientation of the electronic device in electronic device space;

receiving HMD orientation data from an orientation sensor of the HMD indicative of an orientation of the HMD in HMD space;

determining an orientation of the electronic device within the images captured by the camera based on the orientation of the electronic device in the electronic device space and the orientation of the HMD in the HMD space; and detecting the 3D shape of the electronic device at the orientation of the electronic device within the images captured by the camera.

3. The non-transitory computer-readable data storage medium of claim 2, wherein replacing the portion of the synthetic object within the XR environment of the images displayed by the display panel of the HMD based on the corresponding portion of the physical object within the images captured by the camera comprises:

locating the display panel of the electronic device within the images captured by the camera based on the 3D shape of electronic device at the orientation of the electronic device within the images captured by the camera; and replacing the display panel of the synthetic object within the XR environment of the images displayed by the display panel of the HMD with the display panel of the electronic device within the images captured by the camera.

4. The non-transitory computer-readable data storage medium of claim 2, wherein replacing the portion of the synthetic object within the XR environment of the images displayed by the display panel of the HMD based on the corresponding portion of the physical object within the images captured by the camera comprises:
receiving information displayed by the display panel of the electronic device in a manner other than from the images captured by the camera;
generating a virtual representation of the display panel of the electronic device to include the information displayed by the electronic device and at the orientation of the electronic device within the images captured by the camera; and
replacing the display panel of the synthetic object within the XR environment of the images displayed by the display panel of the HMD with the virtual representation of the display panel of the electronic device.

5. The non-transitory computer-readable data storage medium of claim 1, wherein the electronic device has a plurality of fiducial marks, and detecting the physical object within the images captured by the camera comprises:
detecting at least one fiducial mark of the plurality of fiducial marks within the images captured by the camera.

6. The non-transitory computer-readable data storage medium of claim 5, wherein the plurality of fiducial marks are physical fiducial marks, or the plurality of fiducial marks are virtual fiducial marks displayed by the electronic device.

7. The non-transitory computer-readable data storage medium of claim 5, wherein replacing the portion of the synthetic object within the XR environment of the images displayed by the display panel of the HMD based on the corresponding portion of the physical object within the images captured by the camera comprises:
locating the display panel of the electronic device within the images captured by the camera based on the at least one fiducial mark within the images captured by the camera; and
replacing the display panel of the synthetic object within the XR environment of the images displayed by the display panel of the HMD with the display panel of the electronic device within the images captured by the camera.

8. The non-transitory computer-readable data storage medium of claim 5, wherein replacing the portion of the synthetic object within the XR environment of the images displayed by the display panel of the HMD based on the corresponding portion of the physical object within the images captured by the camera comprises:
determining an orientation of the electronic device within the images captured by the camera based on the at least one fiducial mark within the images captured by the camera;
receiving information displayed by the display panel of the electronic device in a manner other than from the images captured by the camera;
generating a virtual representation of the display panel of the electronic device to include the information displayed by the electronic device and at the orientation of the electronic device within the images captured by the camera; and
replacing the display panel of the synthetic object within the XR environment of the images displayed by the display panel of the HMD with the virtual representation of the display panel of the electronic device.

9. The non-transitory computer-readable data storage medium of claim 1, wherein the electronic device has a plurality of virtual fiducial marks, and detecting the electronic device within the images captured by the camera comprises:
detecting at least one virtual fiducial mark of the plurality of virtual fiducial marks within the images captured by the camera.

10. The non-transitory computer-readable data storage medium of claim 9, wherein replacing the portion of the synthetic object within the XR environment of the images displayed by the display panel of the HMD based on the corresponding portion of the physical object within the images captured by the camera comprises:
locating the corresponding portion of the physical object within the images captured by the camera based on the at least one virtual fiducial mark within the images captured by the camera; and
replacing the portion of the synthetic object within the XR environment of the images displayed by the display panel of the HMD with the corresponding portion of the physical object within the images captured by the camera.

11. A head-mountable display (HMD) comprising:
a display panel positionable incident to eyes of a wearer of the HMD and to display one or multiple images of an extended reality (XR) environment;
a camera to capture one or multiple images;
an electronic processor to:
detect a physical object within the one or multiple images captured by the camera, wherein the physical object is an electronic device having a display panel;
determine that the physical object is represented as a synthetic object within the XR environment; and
replace a portion of the synthetic object within the XR environment of the images displayed by the display panel of the HMD based on a corresponding portion of the physical object within the images captured by the camera, wherein the portion of the synthetic object is a display panel of the synthetic object, and wherein the corresponding portion of the physical object is the display panel of the electronic device.

12. The HMD of claim 11, further comprising an inertial measurement sensor to output HMD orientation data indicative of an orientation of the HMD in HMD space, wherein the physical object includes an inertial measurement sensor, and wherein the electronic processor is to detect the physical object within the images captured by the camera by:
retrieving information representing a three-dimensional (3D) shape of the electronic device;
receiving object orientation data from the inertial measurement sensor of the electronic device indicative of an orientation of the electronic device in electronic device space;
determining an orientation of the electronic device within the images captured by the camera based on the orientation of the electronic device in the electronic device space and the orientation of the HMD in the HMD space; and
detecting the 3D shape of the electronic device at the orientation of the electronic device within the images captured by the camera.

13. The HMD of claim 12, wherein the electronic processor is to replace the portion of the synthetic object within the XR environment of the images displayed by the display panel of the HMD based on the corresponding portion of the physical object within the images captured by the camera by:

locating the display panel of the electronic device within the images captured by the camera based on the 3D shape of electronic device at the orientation of the electronic device within the images captured by the camera; and     replacing the display panel of the synthetic object within the XR environment of the images displayed by the display panel of the HMD with the display panel of the electronic device within the images captured by the camera.

14. The HMD of claim 11, wherein the physical object has a plurality of physical fiducial marks on the electronic device or virtual fiducial marks displayed by the display panel of the electronic device, and the electronic processor is to detect the physical object within the images captured by the camera by:

detecting the plurality of physical or virtual fiducial marks within the images captured by the camera.

15. The HMD of claim 14, wherein the electronic processor is to replace the portion of the synthetic object within the XR environment of the images displayed by the display panel of the HMD based on the corresponding portion of the physical object within the images captured by the camera by:

locating the display panel of the electronic device within the images captured by the camera based on the plurality of physical or virtual fiducial marks within the images captured by the camera; and     replacing the display panel of the synthetic object within the XR environment of the images displayed by the display panel of the HMD with the display panel of the electronic device within the images captured by the camera.

\* \* \* \* \*